(12) United States Patent  (10) Patent No.: US 8,312,372 B2
Chen et al.  (45) Date of Patent: Nov. 13, 2012

(54) METHOD FOR CONFIRMING TOUCH INPUT

(75) Inventors: Christina Chen, Redmond, WA (US);
George Henion, Carnation, WA (US);
Nick Hofmeister, Boston, MA (US)

(73) Assignee: Microsoft Corporation, Redmond, WA (US)

( * ) Notice: Subject to any disclaimer, the term of this patent is extended or adjusted under 35 U.S.C. 154(b) by 956 days.

(21) Appl. No.: 11/352,071

(22) Filed: Feb. 10, 2006

(65) Prior Publication Data

US 2007/0192692 A1  Aug. 16, 2007

(51) Int. Cl.
*G06F 3/01* (2006.01)
*G06F 3/00* (2006.01)
*G06F 3/048* (2006.01)

(52) U.S. Cl. ........ 715/702; 715/708; 715/709; 715/810; 715/764

(58) Field of Classification Search .................. 715/702, 715/708, 709, 810, 764; 345/810, 768
See application file for complete search history.

(56) References Cited

U.S. PATENT DOCUMENTS

| | | | |
|---|---|---|---|
| RE32,253 E | 9/1986 | Bartulis et al. | |
| 5,119,079 A | 6/1992 | Hube et al. | |
| 5,889,509 A * | 3/1999 | Sudo | 345/168 |
| 5,969,708 A * | 10/1999 | Walls | 715/857 |
| 6,014,142 A | 1/2000 | LaHood | |
| 6,160,536 A * | 12/2000 | Forest | 345/157 |
| 6,204,828 B1 * | 3/2001 | Amir et al. | 345/7 |
| 6,232,957 B1 * | 5/2001 | Hinckley | 345/156 |
| 6,252,596 B1 | 6/2001 | Garland | |
| 6,331,840 B1 | 12/2001 | Nielson et al. | |
| 6,333,753 B1 * | 12/2001 | Hinckley | 715/768 |
| 6,670,950 B1 | 12/2003 | Chin et al. | |
| 6,712,698 B2 * | 3/2004 | Paulsen et al. | 463/30 |
| 6,803,905 B1 | 10/2004 | Capps et al. | |
| 6,880,998 B2 | 4/2005 | Kraus et al. | |
| 6,882,337 B2 | 4/2005 | Shetter | |
| 6,885,363 B2 * | 4/2005 | Smith | 345/157 |
| 6,896,618 B2 * | 5/2005 | Benoy et al. | 463/25 |
| 7,194,699 B2 * | 3/2007 | Thomson et al. | 715/823 |
| 7,479,949 B2 * | 1/2009 | Jobs et al. | 345/173 |
| 7,793,225 B2 * | 9/2010 | Anzures et al. | 715/772 |
| 7,890,324 B2 * | 2/2011 | Bangalore et al. | 704/231 |

(Continued)

FOREIGN PATENT DOCUMENTS

JP  Sho 62-038927  2/1987

(Continued)

OTHER PUBLICATIONS

International Search Report for PCT/US2007/001611, completed Jun. 25, 2007, mailed Jun. 26, 2007.

(Continued)

*Primary Examiner* — Nicholas Augustine
*Assistant Examiner* — Erik Stitt
(74) *Attorney, Agent, or Firm* — Workman Nydegger

(57) ABSTRACT

A system and method for confirming touch input with a touch-sensitive display that includes detecting contact with a touch-sensitive display at coordinates corresponding with a control. An animated rendering on the touch-sensitive display is displayed, and an action is performed at a conclusion of the animated rendering if contact with the touch-sensitive display at the coordinates corresponding with the control is detected throughout a time period extending from initiation to the conclusion of the animated rendering.

20 Claims, 19 Drawing Sheets

U.S. PATENT DOCUMENTS

| | | | |
|---|---|---|---|
| 2002/0191029 A1* | 12/2002 | Gillespie et al. | 345/810 |
| 2003/0054868 A1* | 3/2003 | Paulsen et al. | 463/1 |
| 2003/0103066 A1 | 6/2003 | Sigl | |
| 2003/0197687 A1* | 10/2003 | Shetter | 345/173 |
| 2003/0210227 A1* | 11/2003 | Smith | 345/157 |
| 2004/0119754 A1* | 6/2004 | Bangalore et al. | 345/809 |
| 2004/0125088 A1 | 7/2004 | Zimmerman et al. | |
| 2005/0079896 A1* | 4/2005 | Kokko et al. | 455/566 |
| 2005/0099400 A1* | 5/2005 | Lee | 345/173 |
| 2006/0005207 A1* | 1/2006 | Louch et al. | 719/328 |
| 2007/0033544 A1* | 2/2007 | Fleisher et al. | 715/800 |
| 2008/0094367 A1* | 4/2008 | Van De Ven et al. | 345/173 |
| 2009/0241072 A1* | 9/2009 | Chaudhri et al. | 715/863 |

FOREIGN PATENT DOCUMENTS

| | | |
|---|---|---|
| JP | Hei 05-341908 | 12/1993 |
| JP | Hei 07-261932 | 10/1995 |
| JP | Hei 10-124257 | 5/1998 |
| JP | 2000163444 | 6/2000 |
| JP | 2002140141 | 5/2002 |
| JP | 2002287862 | 10/2002 |
| JP | 2003019346 | 1/2003 |
| JP | 2003150175 | 5/2003 |
| JP | 2003216301 | 7/2003 |
| JP | 2004070492 | 3/2004 |
| JP | 2004253004 | 9/2004 |
| JP | 2005316790 | 11/2005 |
| JP | 2005322088 | 11/2005 |
| KR | 10-2005-0076472 | 7/2005 |
| KR | 10-2006-0009706 | 2/2006 |
| WO | WO 2005/050428 | 6/2005 |

OTHER PUBLICATIONS

"A Toolkit of Mechanism and Context Independent Widgets;" Murray Crease, Philip Gray and Stephen Brewster; Department of Computing Science, University of Glascow (15 pages).

"Auditory Cues for Browsing, Surfing, and Navigating;" Michael C. Albers; Sun Microsystems, Inc.—JavaSoft (9 pages).

Abstract: "The SonicFinder: An Interface that Uses Auditory Icons;" Human-Computer Interaction, 1989, vol. 4, No. 1 (2 pages).

"How Important is Visual Feedback When Using a Touch Screen?" Michael Deron; Usability News, Software Usability Research Laboratory, Wichita State University (3 pages).

"Effect of Aesthetics on Audio-Enhanced Graphical Buttons;" Sami Ronkainen, Jonna Hakkila, and Leena Pasanen; Proceedings of ICAD 05—Eleventh Meeting of the International Conference on Auditory Display, Limerick, Ireland, Jul. 6-9, 2005 (6 pages).

"TouchTable, An Immersive Visualization and Collaboration Environment" Northrop Grumman Corporation; 2006 (4 pages).

* cited by examiner

METHOD FOR CONFIRMING TOUCH INPUT

BACKGROUND

A variety of data entry techniques have been developed to enhance usability and to make computers more versatile. A typical computing environment, especially a computing environment incorporating graphical user interfaces for user interaction, may be optimized for accepting input from one or more discrete input devices. As an example, an individual may enter characters (i.e., text, numerals, and symbols) with a keyboard and control the position of a pointer image on a display with a pointing device, such as a mouse or trackball. A computing environment incorporating graphical user interfaces may also accept input though one or more natural input methods, including speech input methods and handwriting input methods. With regard to speech input methods, the phonemes of the speech input are analyzed to convert the speech input to typewritten text. With handwriting input methods, a pen-like stylus may be utilized to serve the general purpose of a pointing device and create electronic ink, which is analyzed to convert the handwriting into typewritten text.

Another natural input method is touch input, wherein a user touches (e.g., with a finger) a touch-sensitive display to perform actions or activate buttons and menus rendered by the touch-sensitive display. Touch-sensitive displays generally include two components: a display and a touch sensor. The display may be any conventional display, including a cathode ray tube display, an LED display, or a plasma display, for example. Commonly-utilized touch sensors are generally one of a resistive system and a capacitive system. The touch sensor of the resistive system and the capacitive system overlays the display and is at least semi-transparent, thereby permitting the display to be viewed through the touch sensor. Another touch sensor is a surface acoustic wave system. Each of these systems will be described in greater detail below.

The resistive system includes a glass panel that overlays the display. The glass panel is covered with a conductive layer and a resistive layer that are spaced from each other. A scratch-resistant layer may also form an exterior surface of the resistive system. An electric current passes through the conductive layer and the resistive layer while the display is operational. When the user touches and applies pressure to the scratch-resistant layer, the conductive layer and the resistive layer make contact with each other in a corresponding location. A change in the electrical field is noted and coordinates of the point of contact are calculated and translated into input.

The capacitive system includes a capacitive layer that stores electric charge and overlays the display. When the user touches the capacitive layer, a portion of the electric charge is transferred to the user, thereby decreasing the charge on the capacitive layer. The decrease in charge is measured in circuits located at each corner of the capacitive layer, and the computer calculates coordinates of the point of contact from the relative differences in charge at each corner.

The surface acoustic wave system includes two transducers (one receiving transducer and one sending transducer) placed along axes of the display surface. In addition, the surface acoustic wave system includes various reflectors that reflect a signal sent from one transducer to the other transducer. The receiving transducer detects whether a wave has been disturbed by touch and the computer calculates coordinates of the point of contact, which are translated into input.

SUMMARY

In some circumstances, a user may inadvertently touch or otherwise make contact with areas of the touch-sensitive display, thereby performing actions or activating controls that the user did not intend to perform or activate. For example, the user may inadvertently touch and activate a control that exits a software application, purchases a product or service, or performs irrevocable actions in a gaming application. In order to limit the effect of inadvertently touching a touch-sensitive display, various aspects of the present invention involve a method that includes detecting contact with a touch-sensitive display at coordinates corresponding with a control. An animated rendering on the touch-sensitive display is displayed, and an action is performed at a conclusion of the animated rendering if contact with the touch-sensitive display at the coordinates corresponding with the control is detected throughout a time period extending from initiation to the conclusion of the animated rendering.

The animated rendering may include modifying a color of at least a portion of the animated rendering or may include modifying at least one of a width, a length, a color gradient, and a color spectrum of at least a portion of the animated rendering. Audible signals may also be included with the animated rendering. In some aspects, a software application with a theme is loaded, and the animated rendering is selected to have visual elements corresponding with the theme.

The advantages and features of novelty characterizing various aspects of the invention are pointed out with particularity in the appended claims. To gain an improved understanding of the advantages and features of novelty, however, reference may be made to the following descriptive matter and accompanying drawings that describe and illustrate various embodiments and concepts related to the aspects of the invention.

DESCRIPTION OF THE DRAWINGS

The foregoing Summary, as well as the following Detailed Description, will be better understood when read in conjunction with the accompanying drawings.

DETAILED DESCRIPTION

Introduction

The following discussion and accompanying figures relate to computer systems incorporating a touch-sensitive display and disclose a system and method for confirming selected actions input through use of the touch-sensitive display. In order to utilize a computer system having a touch-sensitive display, a user touches (e.g., with a finger) the touch-sensitive display to perform actions or activate controls (e.g., buttons and menus) rendered by the touch-sensitive display. In some circumstances, the user may inadvertently touch or otherwise make contact with areas of the touch-sensitive display, thereby performing actions or activating controls that the user did not intend to perform or activate. For example, the user may inadvertently touch and activate a control that exits a software application, purchases a product or service, or performs irrevocable actions in a gaming application. In order to limit the effect of inadvertently touching a touch-sensitive display, various aspects of the present invention involve a process wherein the user remains in contact with an area of the touch-sensitive display throughout an animated rendering on the touch-sensitive display in order to confirm that the user intends to perform an action or activate a particular control.

Exemplary Computing System Environment

Figure 1:
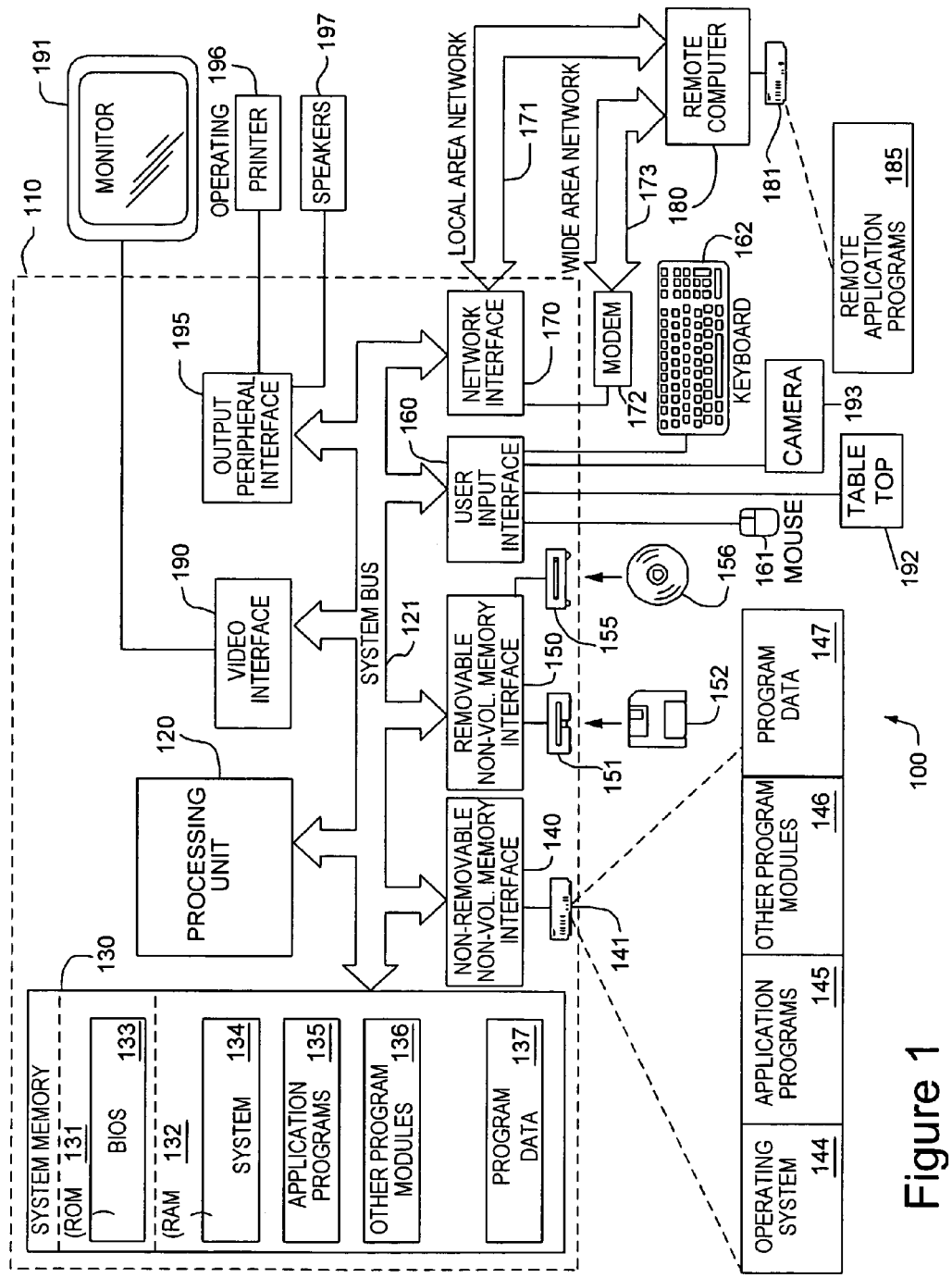
FIG. 1 is a schematic view of an exemplary computing system environment.

FIG. 1 illustrates an example of a suitable computing system environment 100 on which the features herein may be implemented. The computing system environment 100 is only one example of a suitable computing environment and is not intended to suggest any limitation as to the scope of use or functionality of the features described herein. Neither should the computing environment 100 be interpreted as having any dependency or requirement relating to any one or combination of components illustrated in the exemplary operating environment 100.

The features herein are described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the features may be practiced with other computer system configurations, including hand-held devices, multiprocessor systems, microprocessor-based or programmable consumer electronics, minicomputers, mainframe computers, and the like. The features may also be practiced in distributed computing environments where tasks are performed by remote processing devices that are linked through a communications network. In a distributed computing environment, program modules may be located in both local and remote computer storage media including memory storage devices.

With reference to FIG. 1, the exemplary system 100 for implementing features described herein includes a general purpose-computing device in the form of a computer 110 including a processing unit 120, a system memory 130, and a system bus 121 that couples various system components including the system memory to the processing unit 120.

Computer 110 may include a variety of computer readable media. By way of example, and not limitation, computer readable media may comprise computer storage media and communication media. The system memory 130 may include computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, may be stored in ROM 131. RAM 132 may contain data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/non-removable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 may be connected to the system bus 121 through a non-removable memory interface such as interface 140, and magnetic disk drive 151 and optical disk drive 155 may be connected to the system bus 121 by a removable memory interface, such as interface 150.

The drives and their associated computer storage media discussed above and illustrated in FIG. 1 may provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device may also be connected to the system bus 121 via an interface, such as a video interface 190. The video interface 190 may be bidirectional, and may receive video input from sensors associated with the monitor 191. For example, the monitor 191 may be touch and/or proximity sensitive, such that contacts to a monitor surface may be used as input data. The input sensors for affecting this could be a capacitive touch sensitive device, an array of resistive contact sensors, an optical sensor or camera, or any other desired sensor to make the monitor 191 touch and/or proximity sensitive. In an alternative arrangement, or in addition, a touch and/or proximity sensitive input system may be separate from monitor 191, and may include a planar surface such as a table top 192 and any applicable sensing systems to make the planar surface touch sensitive, such as camera 193. In addition to the monitor, computers may also include other peripheral output devices such as speakers 197 and printer 196, which may be connected through an output peripheral interface 195.

The computer 110 may operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 may be connected to the LAN 171 through a network interface or adapter 170. When used in a WAN networking environment, the computer 110 may include a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used. Many of the features described herein may be implemented using computer-executable instructions stored on one or more computer-readable media, such as the media described above, for execution on the one or more units that make up processing unit 120.

Figure 2:
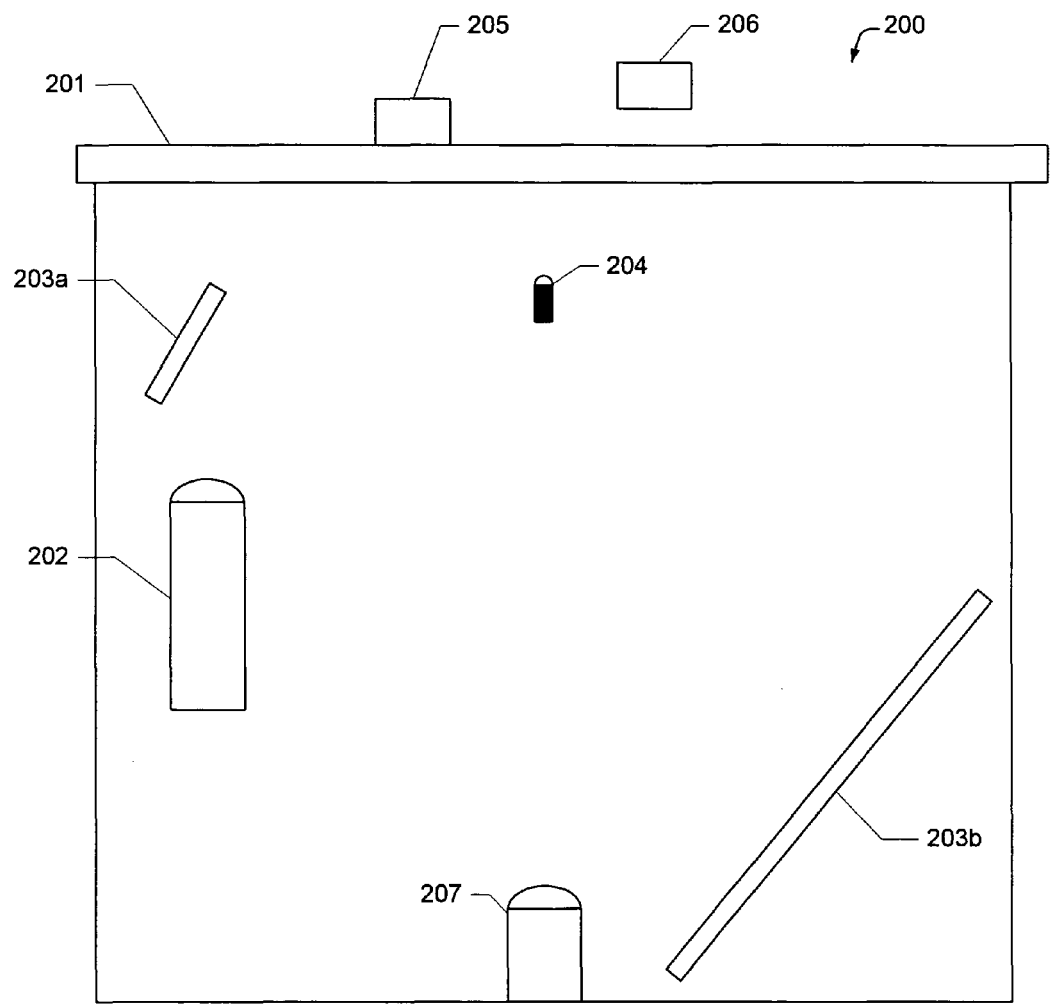
FIG. 2 is a plan view of an exemplary table display device.

The computing device shown in FIG. 1 may be incorporated into a system having table display device 200, as shown in FIG. 2. The display device 200 may include a display surface 201, which may be a planar surface such as a table top. As described hereinafter, the display surface 201 may also help to serve as a user interface.

The display device 200 may display a computer-generated image on its display surface 201, which allows the device 200 to be used as a display monitor for computing processes, displaying television or other visual images, video games, and the like. The display may be projection-based, and may use a digital light processing (DLP) technique, or it may be based on other display technologies, such as liquid crystal display (LCD) technology. A projector 202 may be used to project light onto the underside of the display surface 201. It may do so directly, or may do so using one or more mirrors. As shown in FIG. 2, the projector 202 projects light for a desired image onto a first reflective surface 203a, which may in turn reflect light onto a second reflective surface 203b, which may ultimately reflect that light onto the underside of the display surface 201, causing the surface 201 to emit light corresponding to the desired display.

In addition to being used as an output display for displaying images, the device 200 may also be used as an input-receiving device. As illustrated in FIG. 2, the device 200 may include one or more light emitting devices 204, such as IR light emitting diodes (LEDs), mounted in the device's interior. The light from devices 204 may be projected upwards through the display surface 201, and may reflect off of various objects that are above the display surface 201. For example, one or more objects 205 may be placed in physical contact with the display surface 201. One or more other objects 206 may be placed near the display surface 201, but not in physical contact (e.g., closely hovering). The light emitted from the emitting device (s) 204 may reflect off of these objects, and may be detected by a camera 207, which may be an IR camera if IR light is used. The signals from the camera 207 may then be forwarded to a computing device (e.g., the device shown in FIG. 1) for processing, which, based on various configurations for various applications, may identify the object and its orientation (e.g. touching or hovering, tilted, partially touching, etc.) based on its shape and the amount/type of light reflected. To assist in identifying the objects 205, 206, the objects may include a reflective pattern, such as a bar code, on their lower surface. To assist in differentiating objects in contact 205 from hovering objects 206, the display surface 201 may include a translucent layer that diffuses emitted light. Based on the amount of light reflected back to the camera 207 through this layer, the associated processing system may determine whether an object is touching the surface 201, and if the object is not touching, a distance between the object and the surface 201. Accordingly, various physical objects (e.g., fingers, elbows, hands, stylus pens, blocks, etc.) may be used as physical control members, providing input to the device 200 (or to an associated computing device).

The device 200 shown in FIG. 2 is illustrated as using light projection and sensing techniques for the display of data and the reception of input, but other techniques may be used as well. For example, stylus-sensitive displays are currently available for use with Tablet-based laptop computers, and such displays may be used as device 200. Additionally, stylus- and touch-sensitive displays are available with many personal data assistants (PDAs), and those types of displays may also be used as device 200.

The device 200 is also shown in a substantially horizontal orientation, with the display surface 201 acting as a tabletop. Other orientations may also be used. For example, the device 200 may be oriented to project a display onto any desired surface, such as a vertical wall. Reflective IR light may also be received from any such oriented surface.

Interface Discussion

Figure 3A:
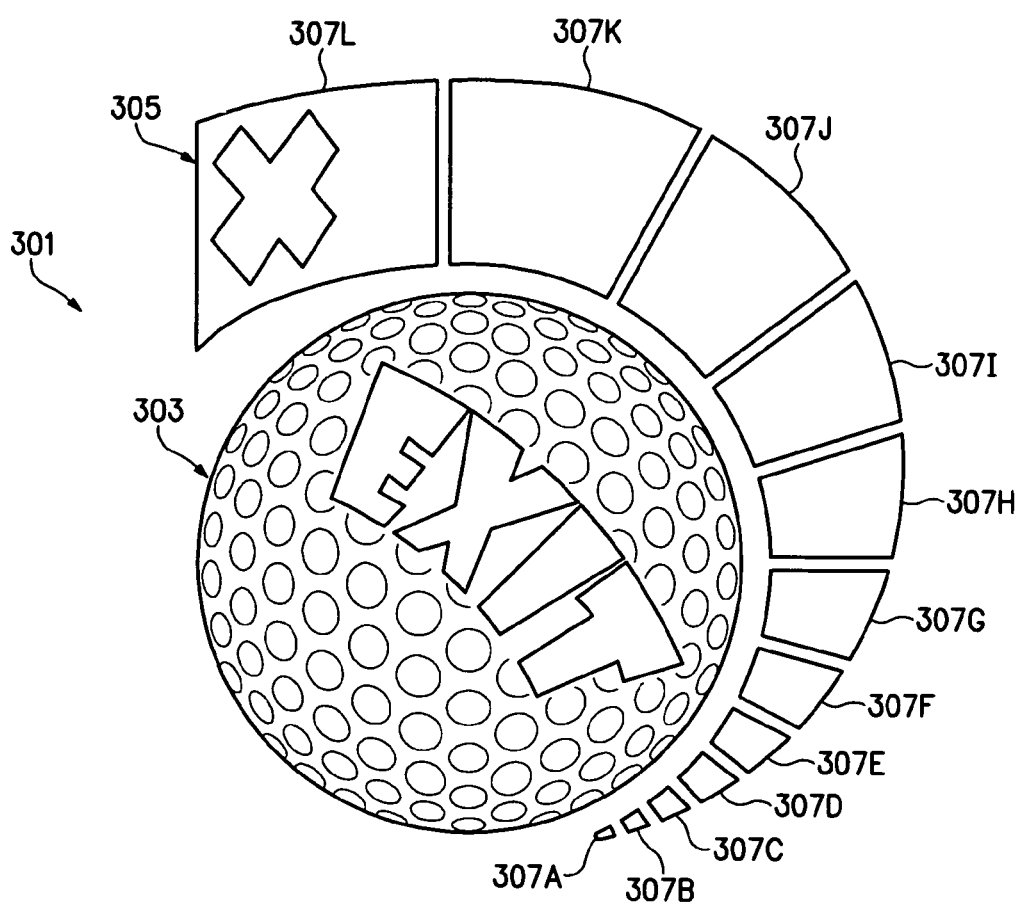
FIGS. 3A-3F illustrate a portion of a first graphical user interface according to aspects of the invention.

With reference to FIG. 3A, a control 301 is depicted as a portion of a graphical user interface that is rendered on a touch-sensitive display, such as display surface 201. Accordingly, the graphical user interface may incorporate other elements that are not depicted in FIG. 3A, including various images that are rendered on the touch-sensitive display and controls that may be activated through touch or other input methods. Control 301 is depicted as including a target region 303 and a feedback/animation region 305. Target region 303 has a generally circular aspect with the appearance of a golf ball, and target region 303 incorporates the word "EXIT" extending in a diagonal direction. Feedback/animation region 305 includes a plurality of block portions 307A-307L that are adjacent to and extend around a portion of target region 303. Whereas block portion 307A has a generally triangular aspect, each of block portions 307B-307L exhibit a trapezoidal, rectangular, or square shape. Furthermore, block portion 307L includes the letter "X" or a similarly-shaped symbol.

Control 301 is an animated feedback confirmation graphic that provides the user with the functionality to perform an irrevocable action of consequence, which is exiting a software application in this example. As described in greater detail below, the general procedure employed by the user to exit the software application involves (a) touching the touch-sensitive display at a position corresponding with control 301 and (b) remaining in contact with the portion of the touch-sensitive display corresponding with control 301 throughout an animation rendered on the touch-sensitive display. If the user remains in contact with the touch-sensitive display throughout the animated rendering and in a position that corresponds with control 301, then the software application exits or otherwise closes. Accordingly, control 301 is a control that the user may utilize to exit the software application. In further aspects of the invention, a similar control may be utilized for other functions, including purchasing products and services or performing irrevocable actions, for example.

Figure 3B:
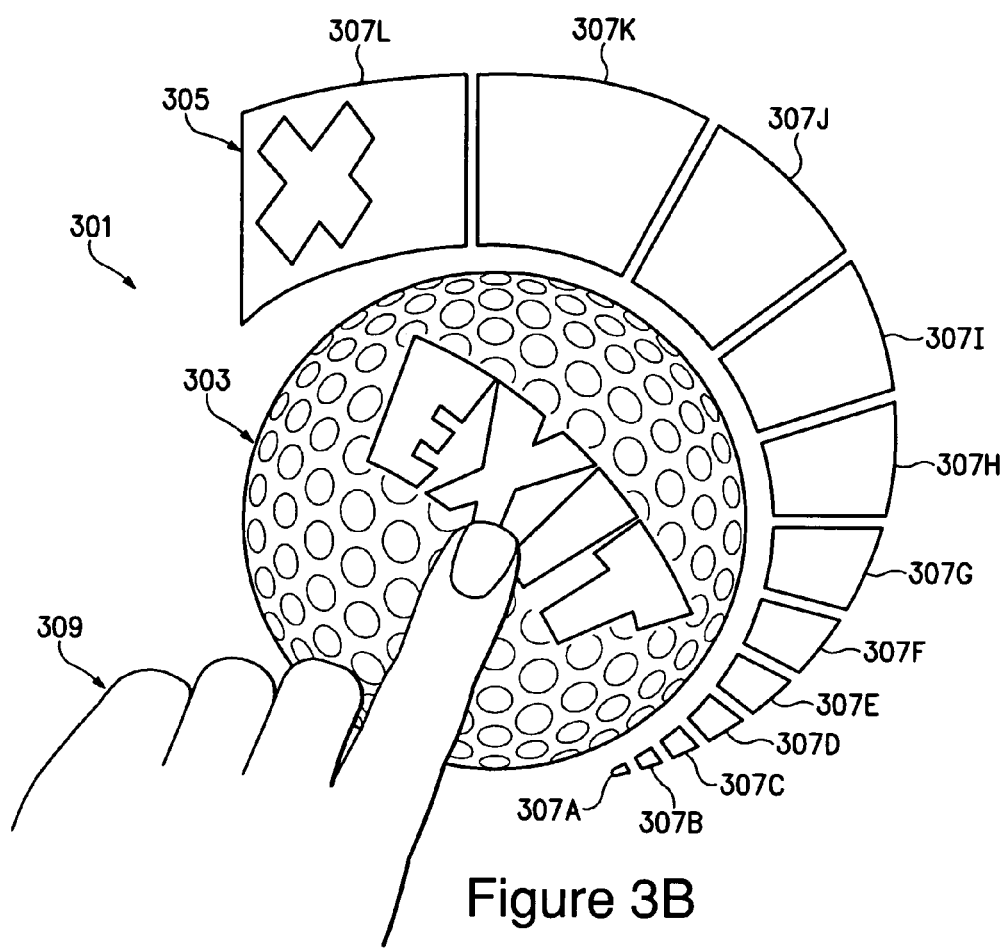

The procedure employed by the user to exit the software application will now be discussed in greater detail. With reference to FIG. 3B, a hand 309 of the user is depicted as touching or otherwise making contact with control 301 (i.e., the position of the touch-sensitive display corresponding with control 301). More particularly, a finger of hand 309 is extended to contact target region 303. Upon contact with control 301, block portions 307A-307L become successively animated, which involves a color change in this example to impart an animated aspect to control 301, as depicted in FIGS. 3C-3F. Once each of block portions 307A-307L have changed color, the animated rendering is complete and the software application exits.

Figure 3C:
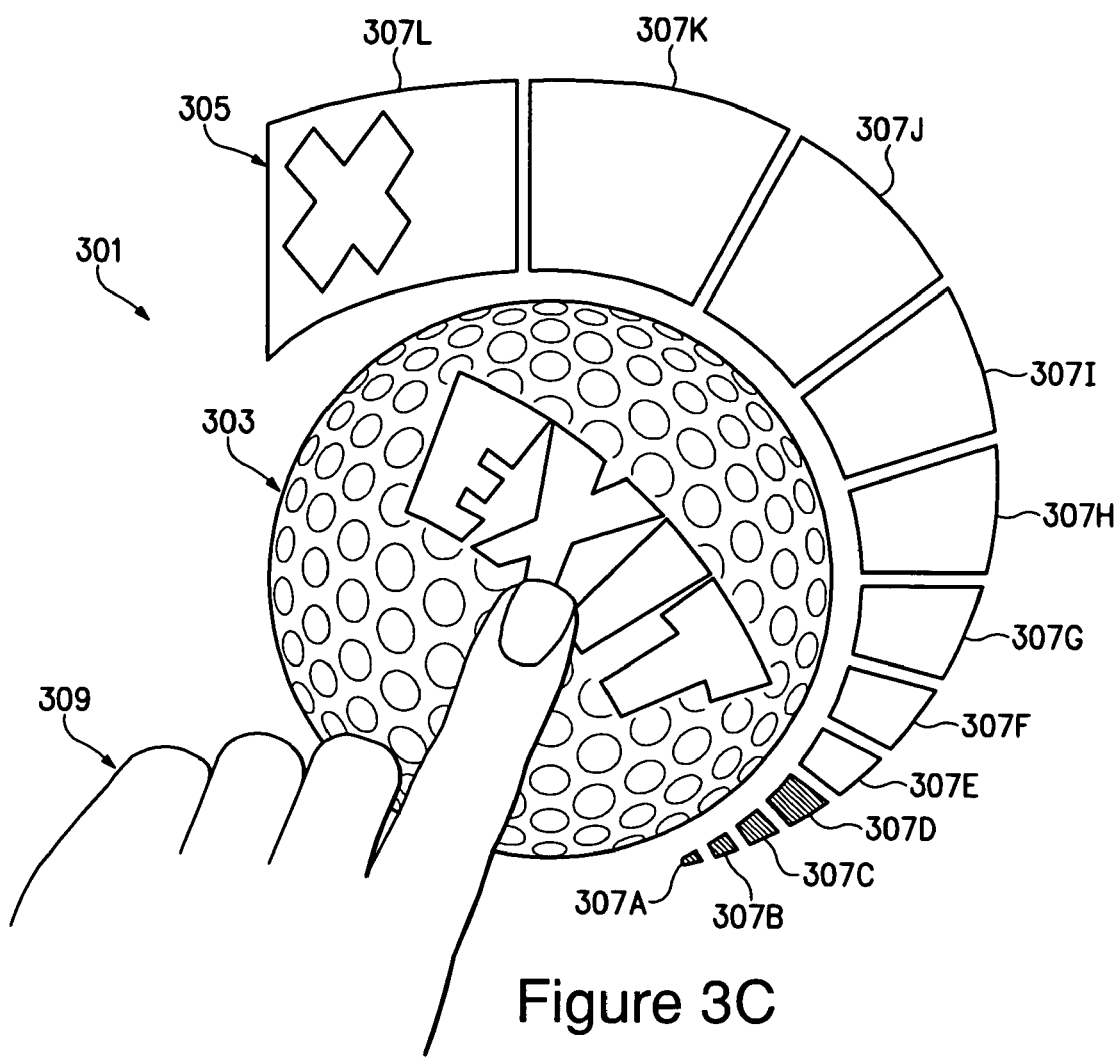
Figure 3D:
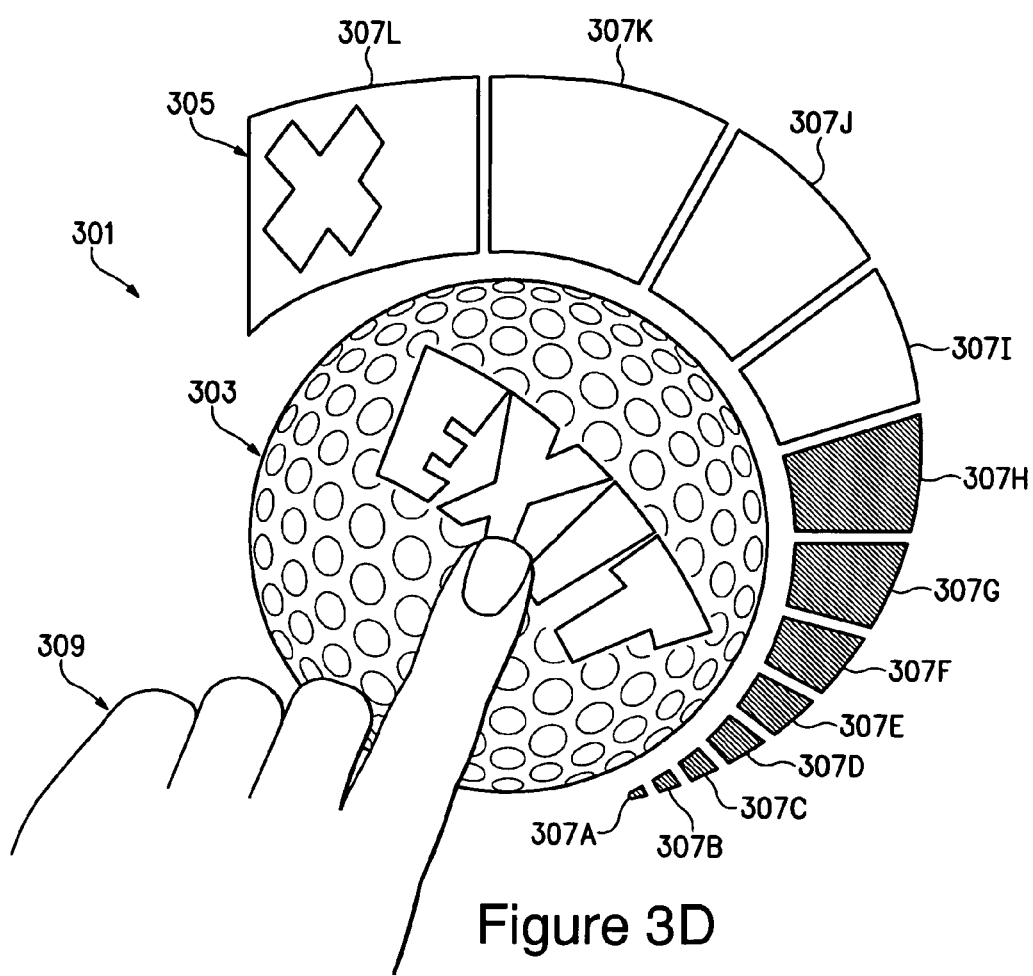
Figure 3E:
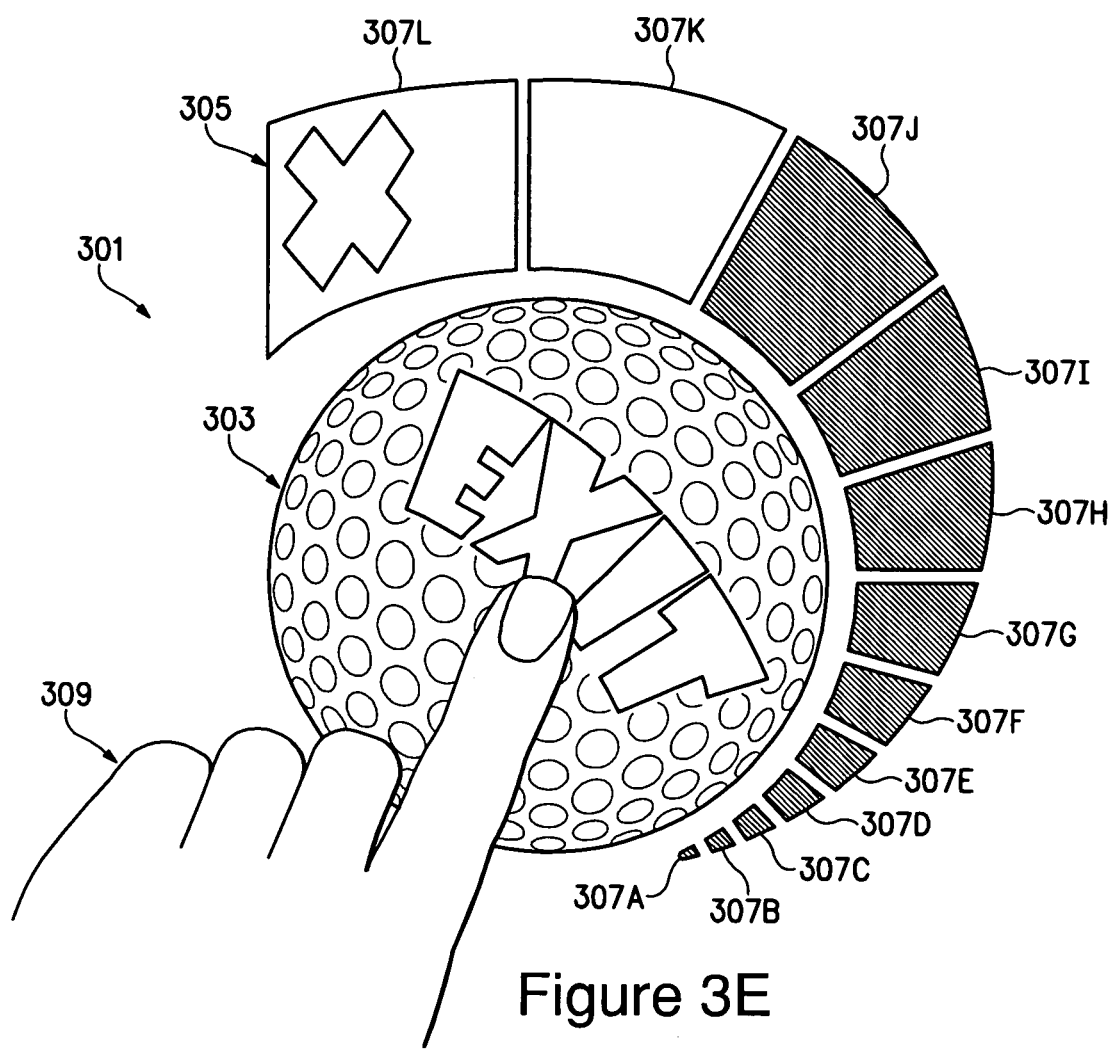
Figure 3F:
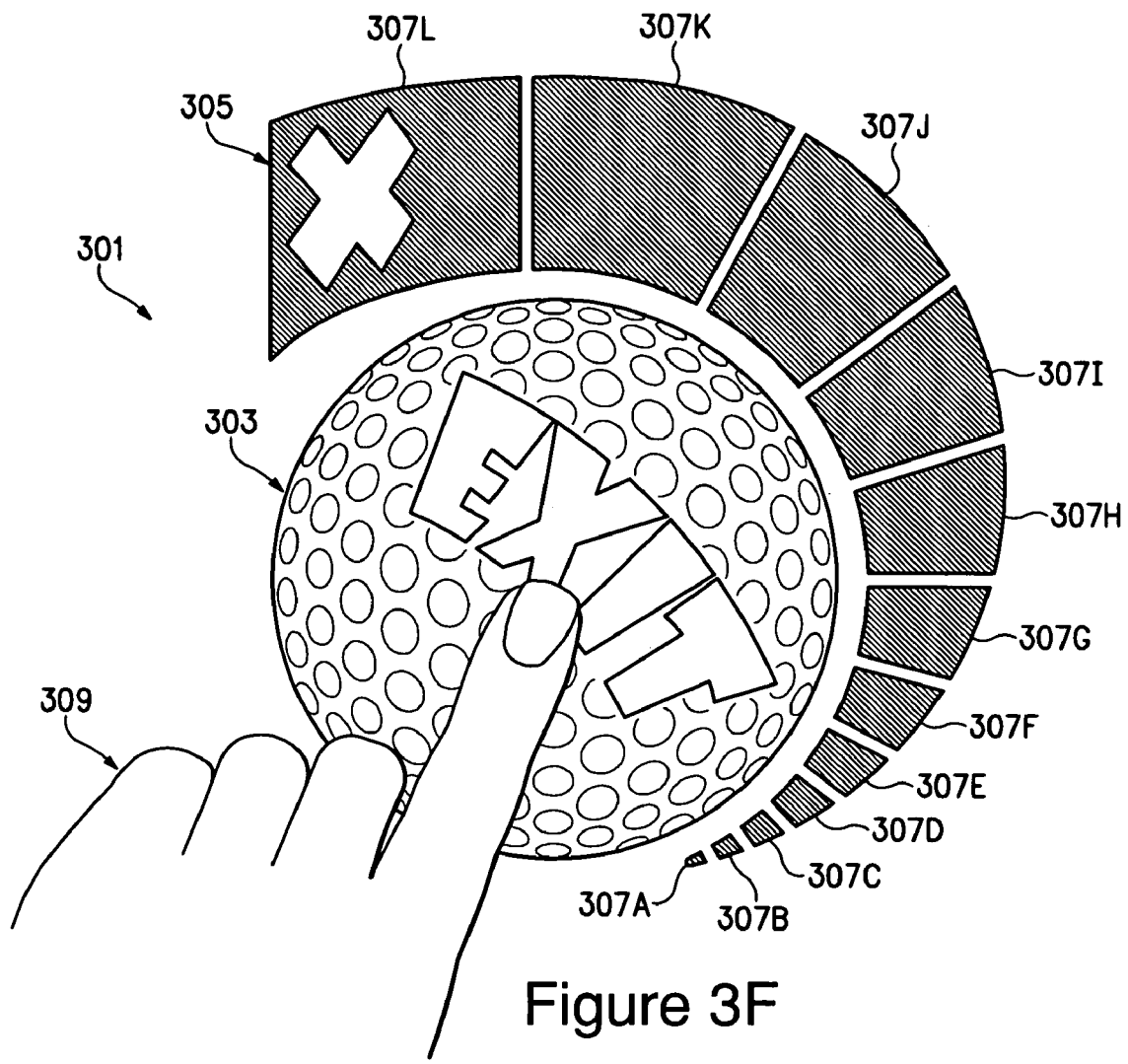

When hand 309 initially makes contact with control 301, as depicted in FIG. 3B, block portions 307A-307L exhibit the same color as in FIG. 3A. Block portion 307A then changes color, followed in series by block portions 307B-307D, as depicted in FIG. 3C. If the user remains in contact with control 301, then block portions 307E-307H will successively change color to continue the animated rendering, as depicted in FIG. 3D. If the user continues to remain in contact with control 301, then block portions 3071 and 307J will successively change color, as depicted in FIG. 3E. Finally, if the user continues to remain in contact with control 301, then block portions 307K and 307L will successively change color, as depicted in FIG. 3F, so that each of block portions 307A-307L have changed color through the animated rendering. Following a color change in each of block portions 307A-307L, the software application exits. Hand 309 is utilized in this example as the physical object that contacts control 301 and initiates the animated rendering. In further configurations of the invention, other physical objects (e.g., elbows, hands, stylus pens, blocks, etc.) may be used as physical control members that provide input to device 200 or otherwise contact control 301.

Based upon the above discussion, making contact with the portion of the touch-sensitive display corresponding with control 301 initiates an animated rendering that includes successive animated changes (i.e., color changes) in block portions 307A-307L. Once each of block portions 307A-307L have changed color, the animated rendering is complete and the software application exits. The time period during which block portions 307A-307L change color (i.e., the time period between contact with control 301 and exiting of the software application) may vary significantly to include a range of one-half second to one minute, for example. In some circumstances, the user may inadvertently touch or otherwise make contact with control 301. If exiting of the software application (i.e., the irrevocable action) occurred upon initial contact with control 301, then inadvertent contact with control 301 would cause the software application to inadvertently close, which may be contrary to the intent of the user. By providing the animated rendering (i.e., a time period) between initial contact and exiting of the software application, the potential for inadvertent exiting of the software application is minimized. Furthermore, by providing a time period between initial contact and exiting of the software application, the user is given an opportunity to contemplate the irrevocable action and whether the user actually intends to perform the irrevocable action. Accordingly, making contact with control 301 and remaining in contact with control 301 throughout the animated rendering serves as confirmation that the user actually intends to exit the software application or otherwise perform an irrevocable action.

Figure 4A:
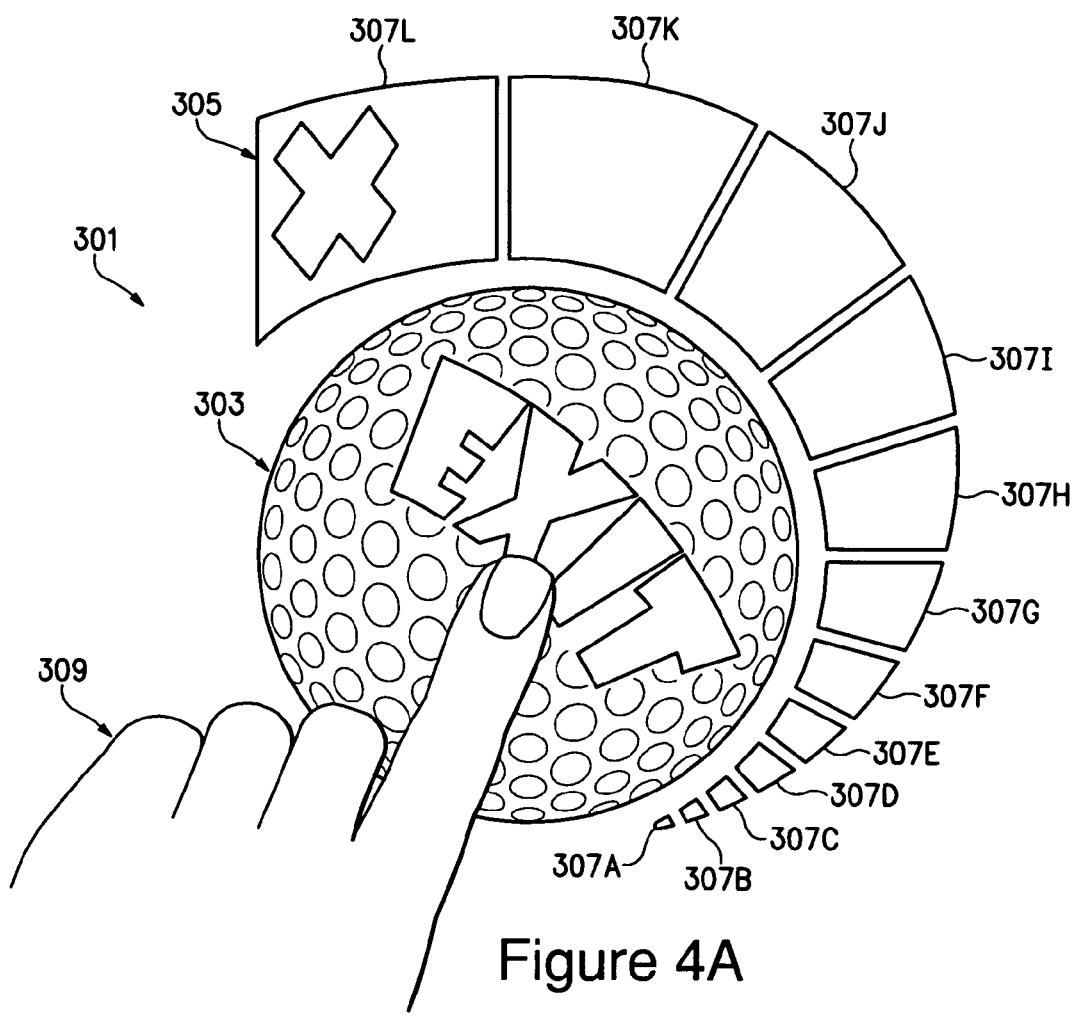
FIG. 4A-4C illustrate the portion of the first graphical user interface according to further aspects of the invention.
Figure 4B:
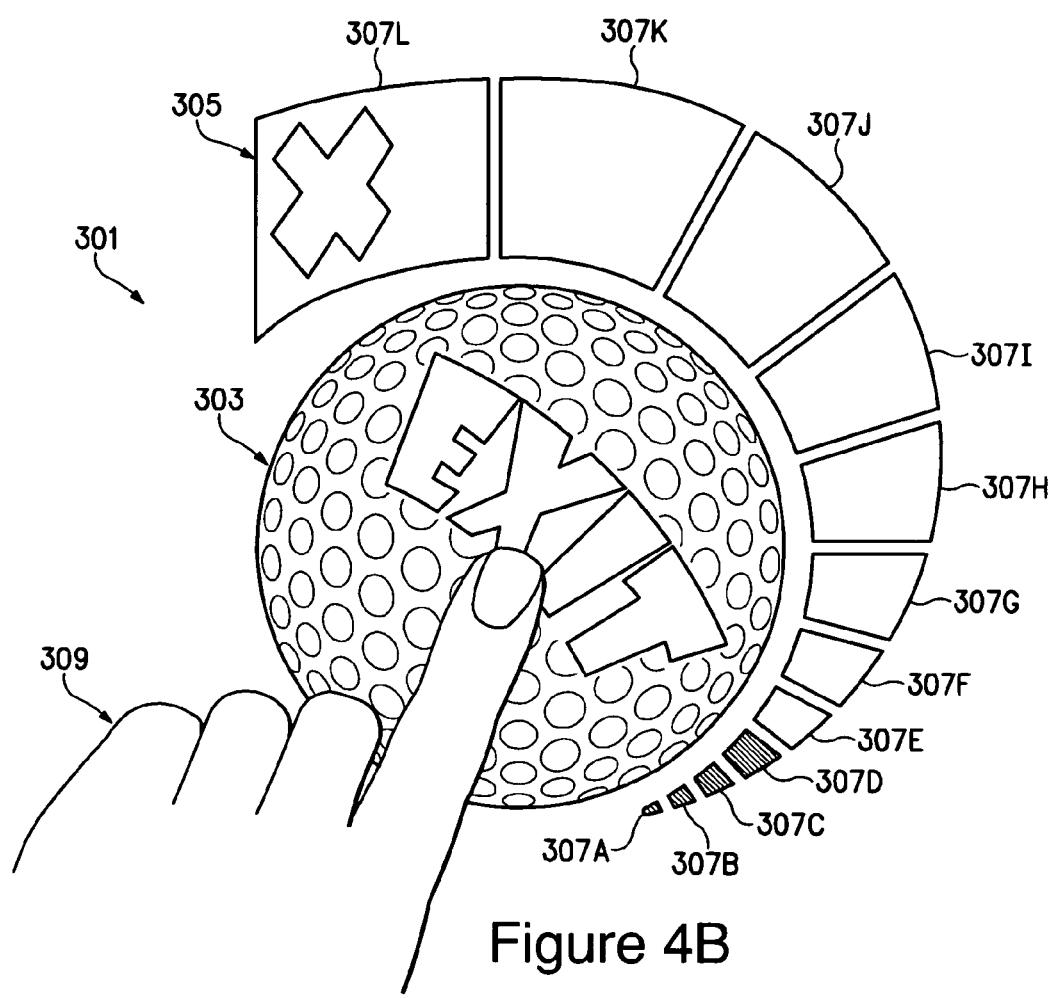
Figure 4C:
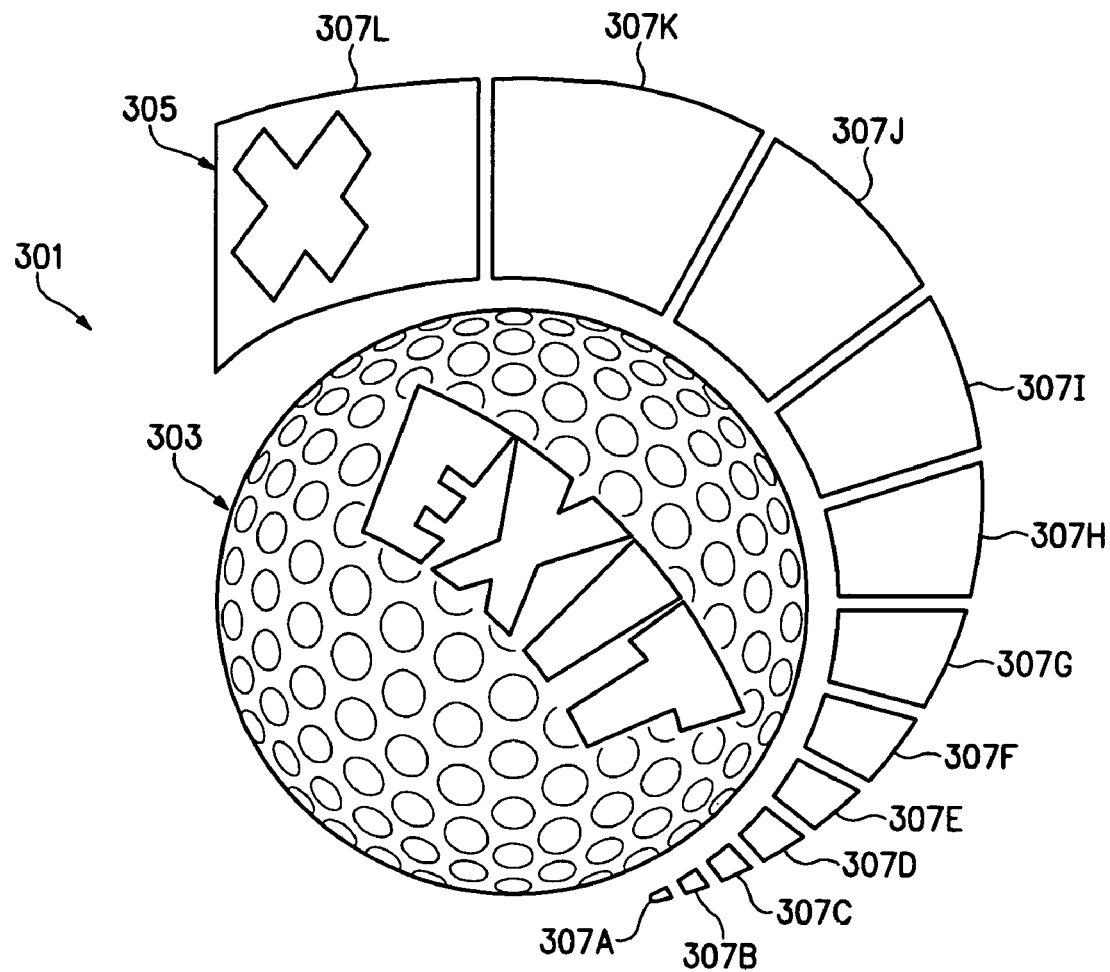

FIGS. 4A-4C depict control 301 in the scenario where the user inadvertently contacts control 301 or decides not to exit the software program following initiation of the animated rendering. With reference to FIG. 4A, control 301 is depicted at initial contact with the user and each of block portions 307A-307L exhibit the same color. As depicted in FIG. 4B, block portions 307A-307D then successively change color in the same manner that is described above for FIG. 3C. In order to cancel or otherwise stop the animated rendering and prevent exiting the software program, the user then removes hand 309 to break contact with control 301. Upon removal of hand 309, the animated rendering ceases and control 301 returns to the initial state, as depicted in FIG. 4C. Accordingly, block portions 307A-307D again change color and return to their initial state.

The sequence of events discussed relative to FIGS. 4A-4C may occur due to an inadvertent contact with control 301. During use of a computer system having a touch-sensitive display, hand 309 or other portions of the user (e.g., wrist, forearm, opposite hand, a portion of loose-fitting clothing) may contact the touch-sensitive display at a location corresponding with control 301. If this occurs, the user may see a change in color of one or more of block portions 307A-307L (i.e., the animated rendering) and quickly discontinue contact in order to prevent the software application from exiting. Even if the user does not see the animated rendering, the time period between initial contact and exiting of the software application may be sufficiently long to ensure that the user discontinues contact through subsequent movements.

The sequence of events discussed relative to FIGS. 4A-4C may also occur due to a change in the intentions of the user. For example, the user may intend to exit the software application and intentionally make contact with control 301. Prior to the end of the animated rendering, however, the user may decide not to exit the software application. In order to prevent exiting, the user merely removes hand 309 from the area of contact with control 301. That is, the user discontinues contact with control 301 in order to prevent exiting of the software application from occurring.

One manner of discontinuing contact with control 301 is to lift or otherwise discontinue contact with the touch-sensitive display. Another manner of discontinuing contact with control 301 is to slide or otherwise move hand 309 to a portion of the graphical user interface that does not correspond with control 301. In some aspects of the invention, however, moving hand 309 to a portion of the graphical user interface that does not correspond with control 301 may not cease the animated rendering of control 301 and prevent the software application from exiting. That is, the computing environment may be configured such that only lifting or otherwise discontinuing contact with the touch-sensitive display is sufficient to cease the animated rendering of control 301 and prevent the software application from exiting.

The animated rendering associated with control 301 is discussed above and depicted in the figures as a sequential change in color of block portions 307A-307L. The change in color may be a spectral color change (e.g., from red to yellow, from blue to green, from orange to blue, or from brown to gold), a change in color gradient (e.g., from light orange to dark orange, from dark blue to light blue, from dark yellow to light yellow, from grey to black), or a combination of a change in spectral color and color gradient. In control 301, block portions 307A-307L may each include a variety of colors that each change in gradient or in spectrum. That is, each of block portions 307A-307L may initially have colors that range from orange to red and, following the color change, block portions 307A-307L may have colors that range from yellow to orange. Control 301 may also be configured such that some or all of block portions 307A-307L initially have different colors that change upon contact. As a further alternative, the colors associated with target region 303 may also change throughout the animated rendering of control 301. Accordingly, the manner in which a color change occurs during the animated rendering of control 301 may vary significantly.

A variety of other animation techniques for control 301 may be utilized in addition to color changes. The animated rendering of control 301 may include changes in the shapes of target region 303 or feedback/animation region 305. For example, target region 303 may increase or decrease in size during the animated rendering, or block portions 307A-307L may change from being triangular, trapezoidal, rectangular, or square to any other geometric or non-geometric shape. Portions of control 301 may also disappear or become transparent or translucent during the animated rendering of control 301. For example, block portions 307A-307L may sequentially disappear as the animated rendering progresses. The animated rendering of control 301 may also incorporate the disappearance of target region 303, an explosion of target region 303, or the bouncing of target region 303 until target region 303 disappears off the touch-sensitive screen as a final element of the animated rendering. Accordingly, a broad range of animation techniques may be utilized with control 301, in addition to the color changes discussed above.

The animated rendering of control 301 is discussed above as having visual aspects that may include color changes or other animation techniques. In addition to visual aspects, the animated rendering of control 301 may also incorporate audible aspects. That is, the time period between contact with control 301 and exiting of the software application may also include an audible signal indicating that the software application will close upon completion of the audible signal. For example, a song clip may begin playing upon initiation of contact with control 301. If contact with control 301 continues throughout the song clip, the software application may exit at completion of the song clip. More particularly, the beginning of the song clip may coincide with an initial change in color of block portion 307A, and the end of the song clip may coincide with the change in color of block portion 307L such that both a visual and an audible signal are utilized at part of the animated rendering of control 301. In addition to song clips, musical scales, increasing or decreasing musical tones, a random collection of notes, spoken words, or other sounds may be utilized in connection with control 301.

Block portions 307A-307L are positioned proximal target region 303 and extend around target region 303. The degree to which elements such as block portions 307A-307L a target region may vary considerably. An advantage to having block portions 307A-307L extend at least 50% of the distance around target region 303 relates to the visibility of the animation associated with block portions 307A-307L. That is, by having block portions 307A-307L extend at least 50% of the distance around target region 303, the animation associated with control 301 is likely to be seen and noticed by the individual even if hand 309 covers or otherwise obscures a portion of control 301.

Figure 5A:
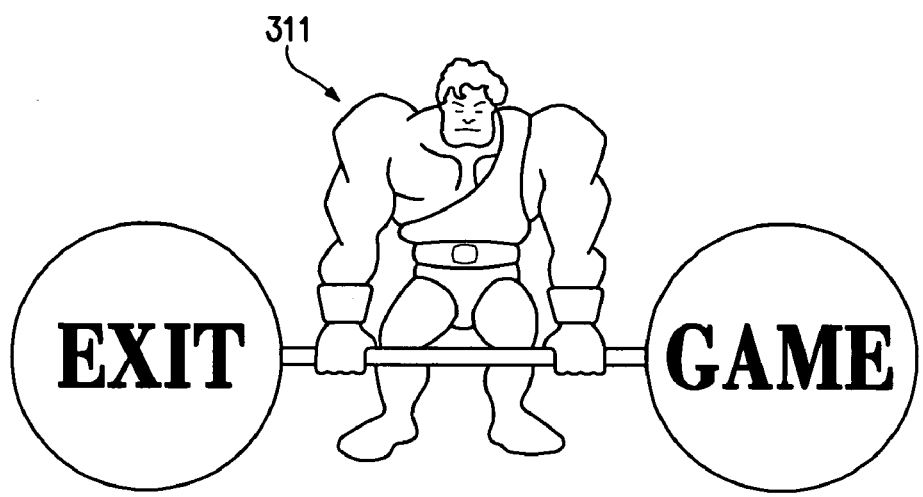
FIG. 5A-5F illustrate a portion of a second graphical user interface according to aspects of the invention.

Control 301 provides an example of one image that may be utilized to perform an action or activate a particular control (i.e., exit the software application). With reference to FIG. 5A, a control 311 is depicted as having an illustrated form of a barbell and an individual grasping the barbell. As with control 301, control 311 provides the user with functionality to exit a software application and the general procedure employed by the user to exit the software application involves (a) touching the touch-sensitive display at a position corresponding with control 311 and (b) remaining in contact with the portion of the touch-sensitive display corresponding with control 311 throughout an animation rendered on the touch-sensitive display. If the user remains in contact with the touch-sensitive display throughout the animated rendering and in a position that corresponds with control 311, then the software application exits or otherwise closes. Accordingly, control 311 is a control that the user may utilize to exit the software application.

Figure 5B:
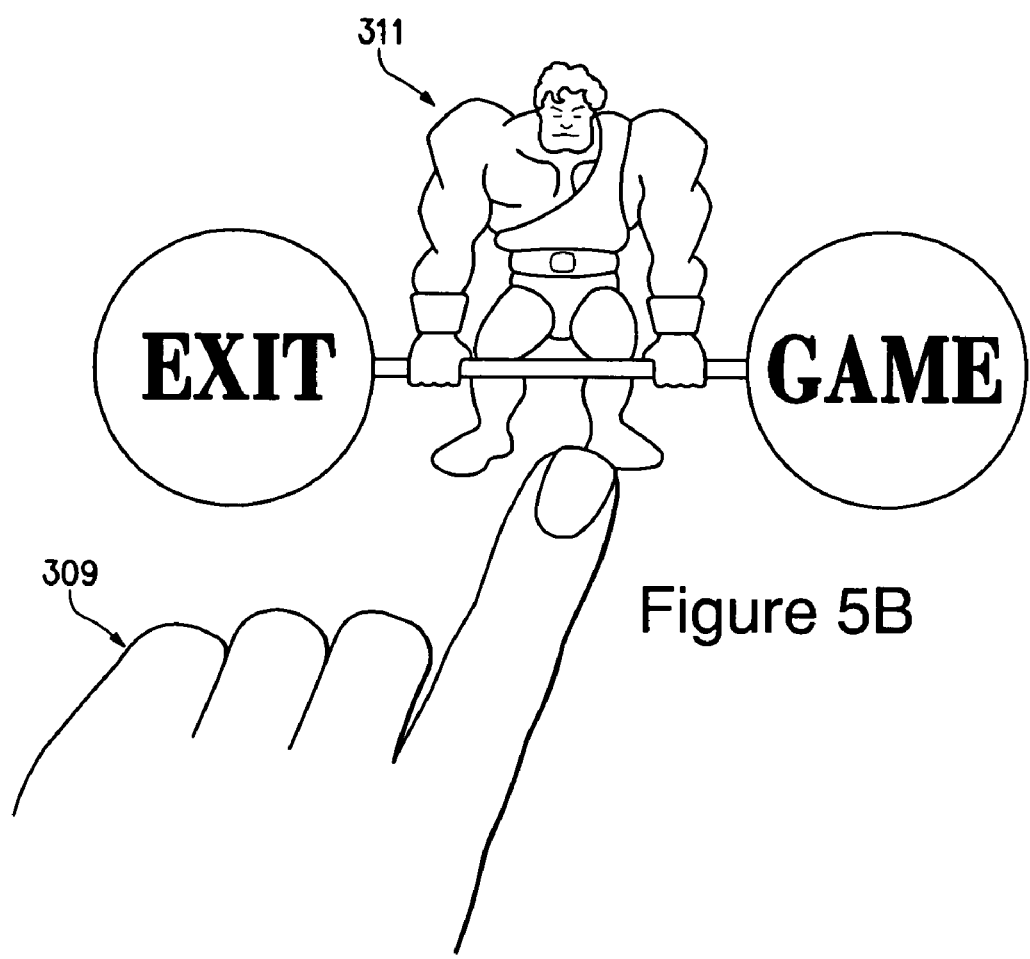
Figure 5C:
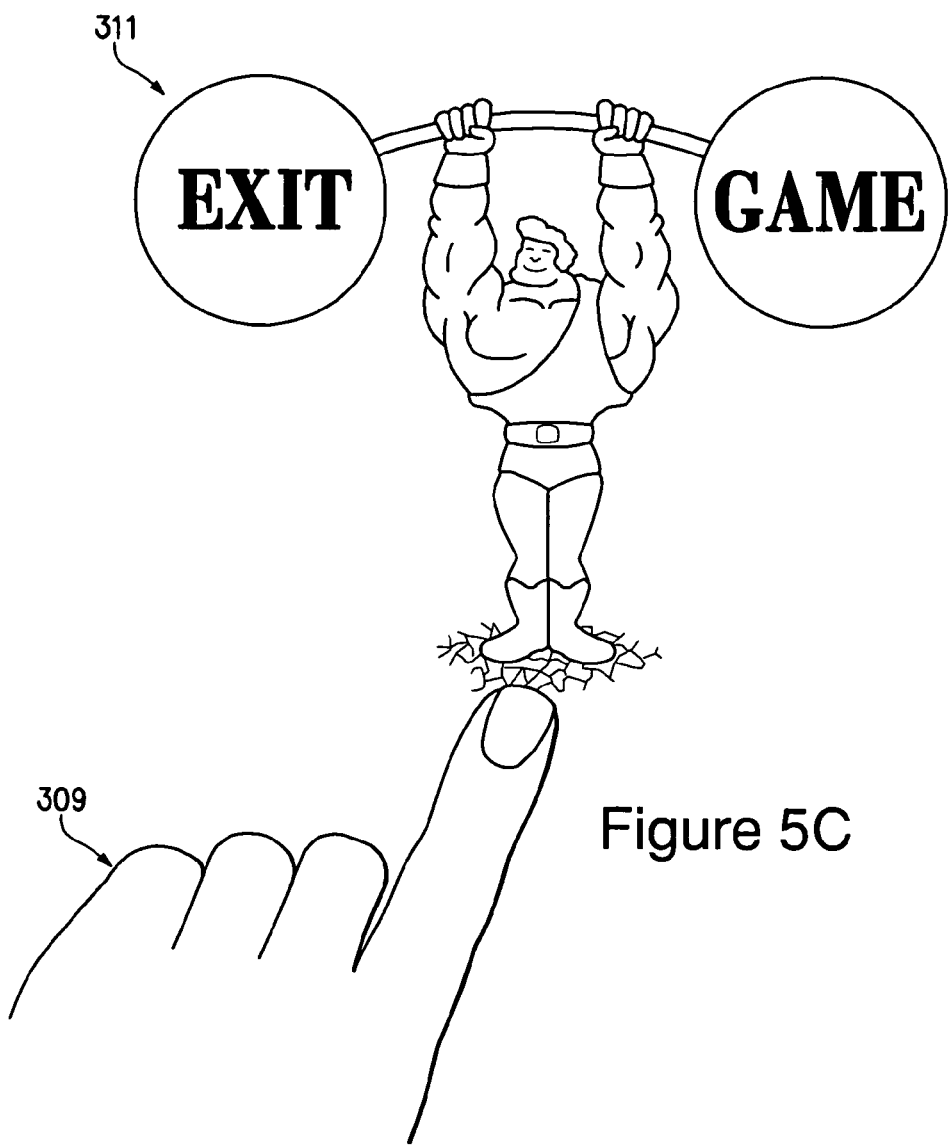
Figure 5D:
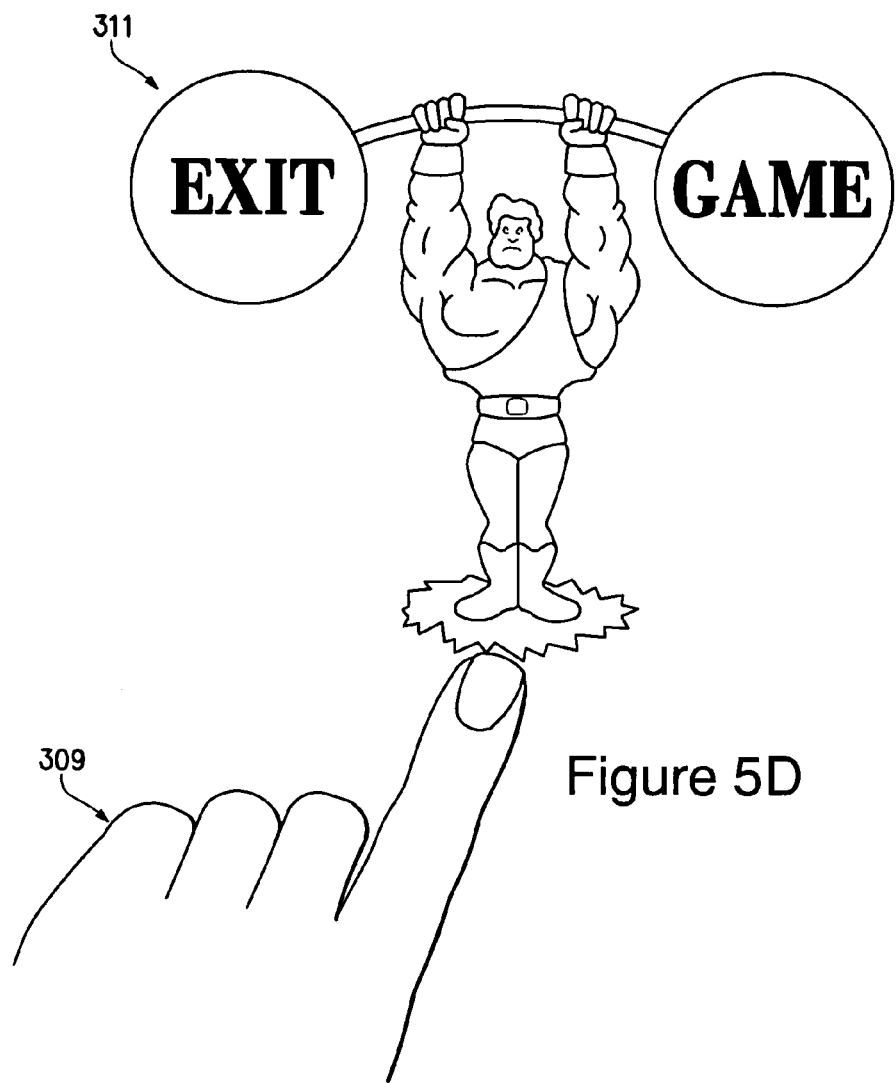
Figure 5E:
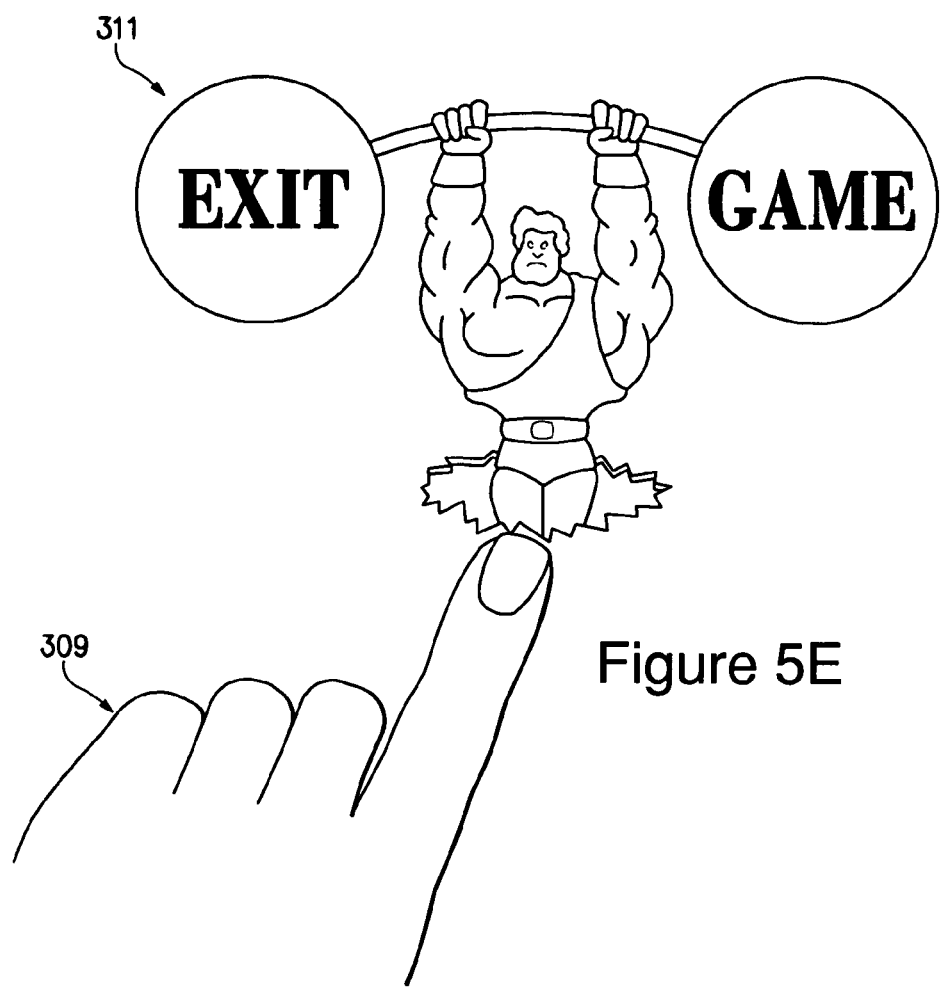
Figure 5F:
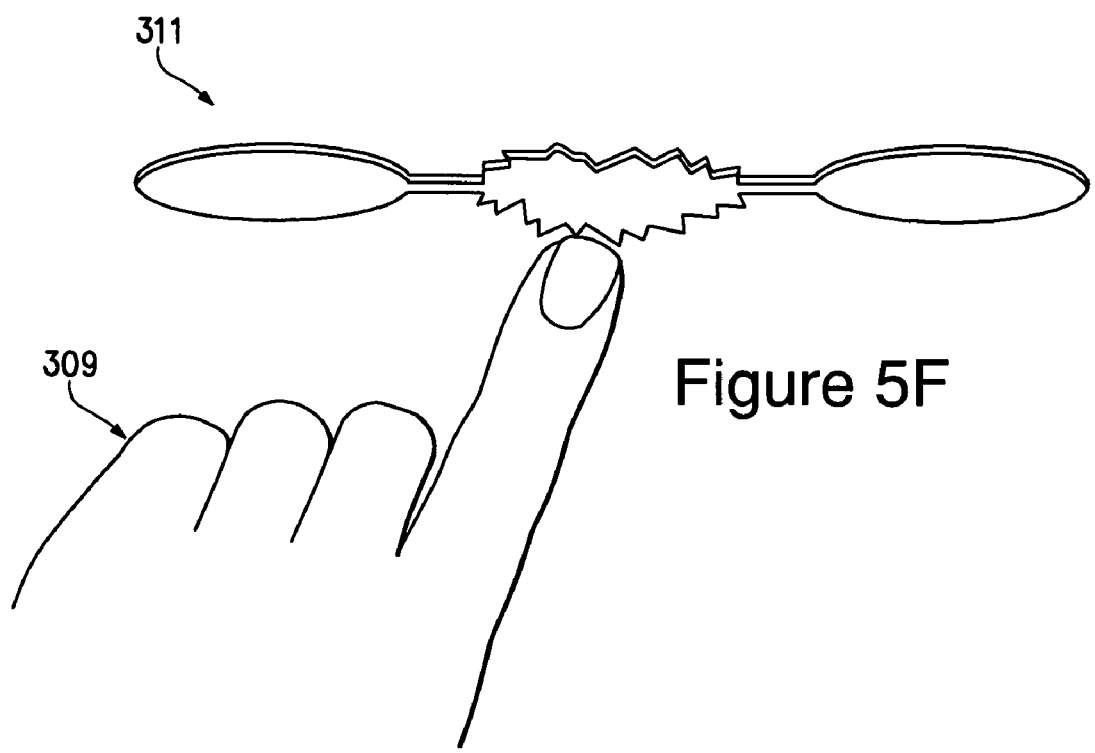

The procedure employed by the user to exit the software application will now be discussed in greater detail. With reference to FIG. 5B, hand 309 is depicted as touching or otherwise making contact with control 311 (i.e., the position of the touch-sensitive display corresponding with control 311). More particularly, a finger of hand 309 is extended to contact control 311. Upon contact with control 311, the individual illustrated in control 311 stands and lifts the barbell upward, as depicted in FIG. 5C, and the ground under the individual appears to begin showing cracks. If the user remains in contact with control 311, then the ground shows further signs of cracking and eventually forms a hole, as depicted in FIG. 5D. If the user continues to remain in contact with control 311, then the individual and the barbell begin to fall through the hole, as depicted in FIG. 5E, and eventually disappear through the hole, as depicted in FIG. 5F. Once the individual and barbell of control 311 disappear, the animated rendering of control 311 concludes and the software application exits. Accordingly control 311 provides a further example of an animated rendering that may be utilized to perform an action or activate a particular function (e.g., exiting) in a software application.

The time period during which the animated rendering of control 311 occurs (i.e., the time period between contact with control 311 and exiting of the software application) may vary significantly to include a range of one-half second to one minute, for example. As with control 301, the user may inadvertently touch or otherwise make contact with control 311. If exiting of the software application occurred upon initial contact with control 311, then inadvertently contacting control 311 would cause the software application to inadvertently close, which may be contrary to the intent of the user. By providing the animated rendering (i.e., a time period) between initial contact and exiting of the software application, the potential for inadvertent exiting of the software application is minimized. Accordingly, making contact with control 311 and remaining in contact with control 311 throughout the animated rendering serves as confirmation that the user actually intends to exit the software application.

Control 311, as with control 301, is intended to provide an example of an animated rendering that may be utilized to confirm the intention of the user. The colors, shapes, and overall content of the animated rendering associated with control 311 may vary significantly. Furthermore, sounds or other audible signals associated with the animated rendering of control 311 may be utilized to enhance the animated rendering.

In control 301, target region 303 and feedback/animation region 305 are two different areas of an image rendered on the touch-sensitive display. With regard to control 311, however, the target region and the feedback/animation region are combined. That is, the portion of control 311 that the user touches is also the portion that provides feedback and the animated rendering. Accordingly, the various regions of a control may be separate or combined. In some configurations, the control may move away from the area that the user touches. In control 311, for example, if the user were to touch an upper portion of the image (i.e., the head of the weightlifter), then that portion of the image would move downward prior to an end of the animated rendering (as in FIG. 5F). In some configurations, continuing to make contact with the touch-sensitive display at the original location will be sufficient to confirm that the action should be performed. In other configurations, the user may be required to follow the movement of the image.

Controls 301 and 311 are predisplayed graphical renderings. More particularly, controls 301 and 311 are rendered on a touch-sensitive display, such as display surface 201, prior to a time that the user makes contact with the display to initiate the animated rendering. In some configurations of the invention, graphical images may appear upon contact with the touch-sensitive display to provide an animated rendering serving as confirmation that the user actually intends to exit the software application.

Controls 301 and 311 each have a theme that may relate to a particular game application. As noted above, target region 303 has a generally circular aspect with the appearance of a golf ball. Control 301 may be suitable, therefore, for use in a sports game or, more particularly, a game involving golf. Similarly, control 311 involves the concept of weightlifting and may also be suitable, therefore, for use in a sports game or a game with a circus theme. If, for example, a software application involves the game of chess, the animated rendering utilized to exit the software application or perform other actions associated with the software application may involve visual elements associated with the game of chess (e.g., chess pieces or a chess board). A software application may also relate to the management of money (e.g., accounting software or tax calculation software) and visual elements associated with the software may have money or money-related elements as a theme. Accordingly, the animated rendering may be selected to have visual elements corresponding with the theme of a software application. As noted above, the animated rendering of controls 301 and 311 may also incorporate audible aspects in addition to visual aspects, and the audible aspects may also have a theme that relates to the software application.

In addition to hand 309, other physical objects (e.g., elbows, hands, stylus pens, blocks, etc.) may be used as physical control members that provide input to device 200 or otherwise contact control 301. In a chess game, for example, a chess piece that rests upon device 200 may be the element that provides input. More particularly, moving the chess piece from one location to another may be the input, and an animated rendering may initiate upon placing the chess piece at a desired location. If the user relocates the chess piece prior to the conclusion of the animated rendering, then the move may be taken back. If, however, the user does not relocate the chess piece prior to the conclusion of the animated rendering, then the move may become irrevocable. Accordingly, animated renderings may be utilized with a variety of physical objects to confirm a user input.

Each of images 301 and 311 are utilized to demonstrate a confirmation process for exiting a software application. In addition to exiting a software application, a similar process of utilizing an animated rendering may be utilized for purchasing a product or service, activating buttons or menus, or performing irrevocable actions in a gaming application, for example. As another example, a software application involving the game of poker may utilize an animated confirmation process to ensure that the user intends to go all-in (i.e., bet all chips) prior to performing the action. Accordingly, the use of an animated rendering to confirm the intentions of a user may be utilized perform a variety of actions or activate various controls in a computing environment having a touch-sensitive display.

System Discussion

Figure 6:
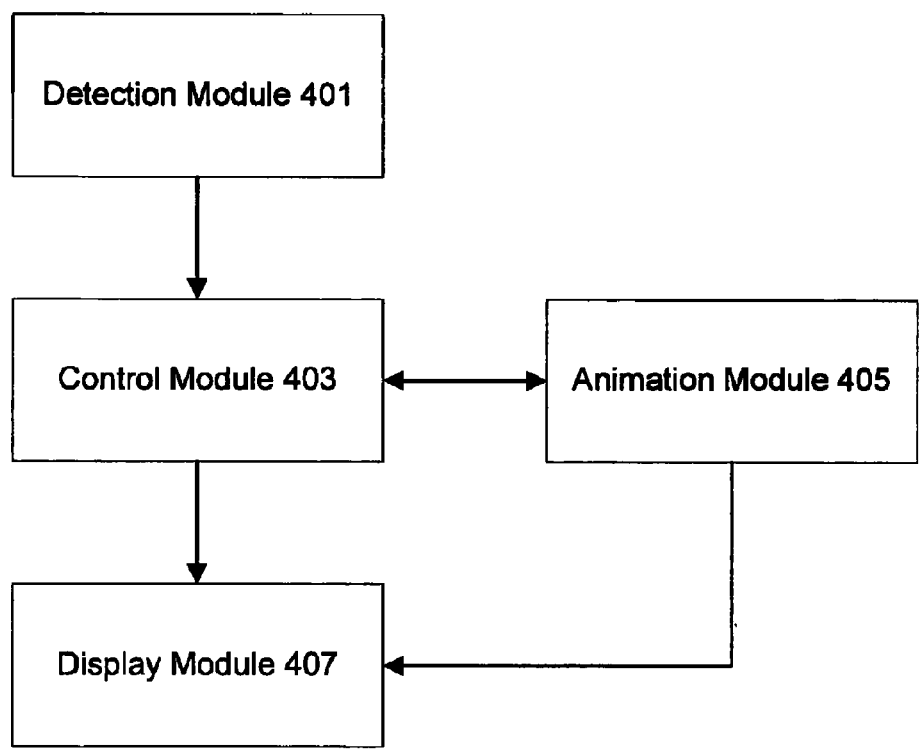
FIG. 6 is a schematic diagram of a system in which various aspects of the invention may be implemented.

With reference to FIG. 6, an illustrative system incorporating aspects of the invention is disclosed. The system includes a detection module 401, a control module 403, an animation module 405, and a display module 407. Detection module 401 detects input from the touch-sensitive display and processes the input. Control module 403 controls the overall operation of each of detection module 401, animation module 405, and display module 407. Animation module 405 stores data relating to the animated rendering of images 301 and 311 and transmits signals relating to the animated rendering to either of control module 403 or display module 407. Finally, display module 407 transmits signals relating to the graphical user interface to the touch-sensitive display, based upon signals from either control module 403 or animation module 405.

The general operation of modules 401-407 will now be discussed. Detection module 401 detects input from the touch-sensitive display, processes the input, and relays the processed input to the control module 403. Control module 403 then directs display module 407 to modify the graphical user interface rendered on the touch-sensitive display based upon the input detected by detection module 401. For example, if the user makes contact with the touch-sensitive display at a position that corresponds with a control, then detection module 401 detects the input and transmits a corresponding signal to control module 403. If the control is not one where confirmation through an animated rendering is necessary, then control module 403 may transmit a signal to display module 407, where appropriate, relating to a modification in the graphical user interface. More particularly, if the user activated a control relating to a menu, for example, then the graphical user interface may be modified to display the menu.

If the control is one where confirmation through an animated rendering is desired (i.e., one of images 301 and 311), then control module 403 may transmit a corresponding signal to animation module 405. Upon receipt of the signal from control module 403, animation module 405 transmits signals relating to the animated rendering to display module 407. Display module 407 then transmits a corresponding signal to the touch-sensitive display, thereby rendering the animation on the touch-sensitive display. More particularly, if the user activated a control relating to one of images 301 and 311, then the images rendered on the graphical user interface may be modified to display the animated rendering associated with one of images 301 and 311.

As noted above, the animated renderings associated with images 301 and 311 continue as long as the user remains in contact with a particular portion of the touch-sensitive display. Detection module 401 continues, therefore, to detect whether the user makes contact with the touch-sensitive display and relays associated signals to control module 403. If the user discontinues contact, control module 403 directs animation module 405 to discontinue transmission of signals associated with the animated rendering. If the user does not discontinue contact with the touch-sensitive display, then upon completion of the animated rendering, animation module 405 transmits a corresponding signal to control module 403. Control module 403 then performs an action (i.e., exiting a software application) and directs display module 407 accordingly. As an alternative, control module 403 may continuously poll animation module 405 to determine when the animated rendering is complete.

Aspects of the invention may be implemented through hardware or software. That is, the computing environment may incorporate hardware that operates in the manner described above. As an alternative, however, the various functions of modules 401-407 may be incorporated into the software of the computing environment. That is, input from the touch-sensitive display, for example, may be transmitted directly to the computing environment. Furthermore, any of modules 401-407 may be incorporated into a single module or formed from multiple modules. Accordingly, the manner in which aspects of the invention are implemented may vary significantly.

Method Discussion

An enhanced understanding of the system discussed above may be gained through reference to FIG. 7, which discloses a flow diagram illustrating steps performed in executing various aspects of the invention. Initially, input from the touch-sensitive display is received (Step 501). As discussed above, detection module 401 detects input from the touch-sensitive display, processes the input, and relays the processed input to the control module 403.

Following receipt of the input, the system (e.g., control module 403) determines whether the input is in an area of a control requiring confirmation (Step 503). Some controls, such as conventional buttons and menus, for example, do not require confirmation. If confirmation is not required, then the function associated with the input is performed (Step 505). Other controls do require confirmation to, for example, prevent an inadvertent activation Examples of controls that may require confirmation include controls that exit a software application, purchase a product or service, or perform irrevocable actions in a gaming application. Accordingly, if confirmation is required, then an animated rendering is initiated (Step 507). As discussed above, control module 403 may transmit a signal to animation module 405 when the control is one where confirmation through an animated rendering is necessary. Upon receipt of the signal from control module 403, animation module 405 transmits signals relating to the animated rendering to display module 407, which directs the animated rendering to be displayed on the touch-sensitive display.

Following initiation of the animated rendering, the system determines whether input in the area of the control is continuing to be received (Step 509). If the input does not continue to be received, then the control is reset (Step 511), which may involve ceasing the animated rendering and returning the image associated with the control to an initial state. As discussed above, FIG. 4B discloses control 301 as an animated rendering. If the user discontinues the input (i.e., removes hand 309 to break contact with control 301), then the animated rendering ceases and control 301 returns to the initial state, as depicted in FIG. 4C.

If the input continues to be received (Step 509), then the system determines whether the animated rendering is complete (Step 513). When the animated rendering is not complete, the system again determines whether input in the area of the control is continuing to be received (Step 509) and this process continues until either input is no longer received or the animated rendering is complete. When the animated rendering is complete, the function associated with the control is performed (Step 515). Accordingly, following completion of the animated rendering, a software application is exited, a product or service is purchased, or irrevocable actions in a gaming application are performed, for example.

Based upon the above discussion, input in an area of a control requiring confirmation (i.e., either one of images 300 and 340) initiates an animated rendering. If the input continues to be received and the animated rendering has sufficient time to be completed, then the function associated with the control is performed. If, however, the input ceases prior to completion of the animated rendering, then no function associated with the control is performed and the control resets. Accordingly, when the user (a) contacts the touch-sensitive display in the area of a control requiring confirmation and (b) remains in contact throughout the animated rendering, then the function associated with the control is performed.

Figure 7:
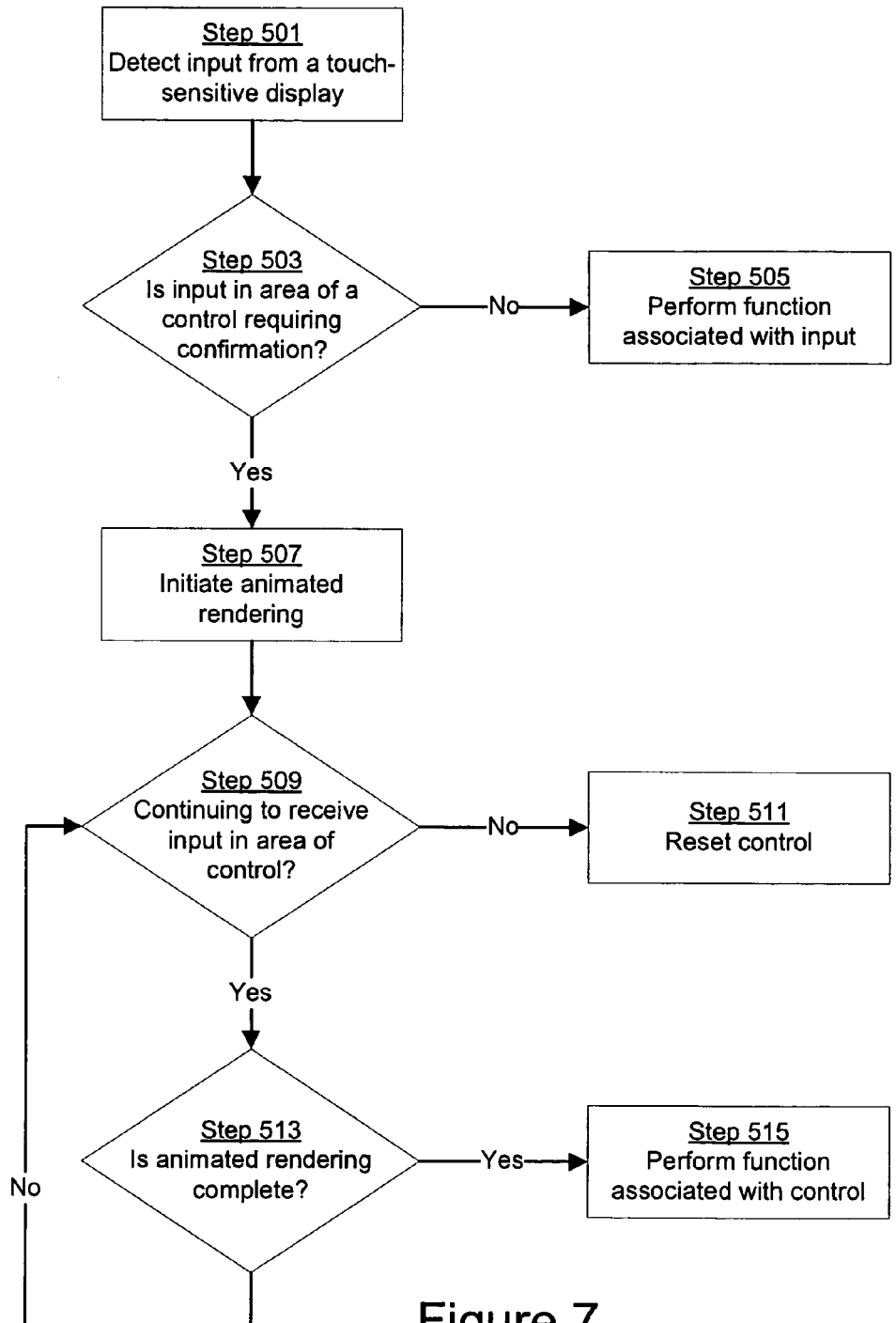
FIG. 7 is a flow diagram illustrating a method according to various examples of the invention.

The various steps associated with the flow diagram of FIG. 7 may be performed in a different order or further steps may be added within the scope of the invention. For example, Step 513 (i.e., Is animated rendering complete?) may be performed prior to Step 509 (i.e., Continuing to receive input in area of control?). Furthermore, some configurations may incorporate a step of determining whether input in the area of the control is continuing to be received between Steps 513 and 515. Accordingly, the order and number of steps may vary significantly.

The invention is disclosed above and in the accompanying drawings with reference to a variety of embodiments. The purpose served by the disclosure, however, is to provide an example of the various features and concepts related to aspects of the invention, not to limit the scope of aspects of the invention. One skilled in the relevant art will recognize that numerous variations and modifications may be made to the embodiments described above without departing from the scope of the invention, as defined by the appended claims.

That which is claimed is:

1. In a computing environment, the computing environment comprising a display, the display configured to be used as an input-receiving device, a method of preventing inadvertent interaction with the display from causing an action to be performed, the method comprising steps of:
    detecting a contact with a display at an original location at coordinates corresponding with a target;
    in response to a detected contact, beginning to display an animated rendering on the display proximate to the target and continuing to display portions of the animated rendering on the display proximate to the target so long as contact remains with the display, including the animated rendering moving;
    if the contact is maintained throughout the animated rendering, including not continuous contact at the original location, but rather the user contact following the movement of the animated rendering to a location other than the original location, while maintaining contact with the animated rendering to follow the animated rendering as the animated rendering moves from the original location to the location other than the original location, then performing an action including at least one of exiting a software application, purchasing a product or service, or performing an irrevocable action in a gaming application, at the conclusion of the animated rendering as a result of detecting that the contact was maintained throughout a time period extending from initiation to conclusion of the animated rendering and wherein the period extending from the initiation to conclusion of the animated rendering is a period included in the range of one-half second to one minute so as to prevent the action as a result of inadvertent contact with the display, and if the contact is interrupted prior to an end of the animated rendering, ceasing displaying the animated rendering and not performing the action and resetting a control for performing the action.

2. The method recited in claim 1, wherein the step of displaying the animated rendering includes modifying a color of at least a portion of the animated rendering.

3. The method recited in claim 1, wherein the step of displaying the animated rendering includes modifying at least one of a width, a length, a color gradient, and a color spectrum of at least a portion of the animated rendering.

4. The method recited in claim 1, further comprising playing audio data so long as contact is maintained with the display, including playing a song clip.

5. The method recited in claim 1, wherein the step of displaying the animated rendering includes moving a portion of an image associated with the target.

6. The method recited in claim 1, further including steps of:
    loading a software application with a theme; and
    selecting the animated rendering to have visual elements corresponding with the theme.

7. The method recited in claim 1, further including a step of displaying the target prior to the step of detecting contact.

8. The method recited in claim 1, wherein performing the action includes exiting a software application.

9. A method for ensuring confirmation of a command input in an application, the method comprising steps of:

displaying, on a display, a user interface having a target;
detecting contact with the display at an original location at coordinates corresponding to the target;
in response to the detected contact, displaying an animated feedback confirmation graphic proximate to the target, the animated feedback confirmation graphic having a theme associated with the application and the animated feedback confirmation graphic being displayed in an animated rendering so long as contact is maintained with the display, and wherein the animated rendering causes the confirmation graphic to move;
if the contact is maintained with the display proximate to the confirmation graphic throughout the animated rendering including user contact not continuous at the original location, but rather following the movement of the image to a location other than the original location, while maintaining contact with the animated rendering to follow the animated rendering as the animated rendering moves from the original location to the location other than the original location, then performing an action including at least one of exiting a software application, purchasing a product or service, or performing an irrevocable action in a gaming application, at the conclusion of the animated rendering as a result of detecting that the contact was maintained throughout a time period extending from initiation to conclusion of the animated rendering and wherein the period extending from the initiation to conclusion of the animated rendering is a period included in the range of one-half second to one minute so as to prevent the action as a result of inadvertent contact with the display, and if the contact is interrupted prior to an end of the animated rendering, ceasing displaying the animated rendering and not performing the action and resetting a control for performing the action.

10. The method recited in claim 9, wherein the step of displaying the animated feedback confirmation graphic includes modifying a color of at least a portion of the animated rendering.

11. The method recited in claim 9, wherein the step of displaying the animated feedback confirmation graphic includes positioning the graphic around at least 50% of the target.

12. The method recited in claim 9, wherein the step of displaying the animated feedback confirmation graphic includes modifying at least one of a width and a length of at least a portion of the animated rendering.

13. The method recited in claim 9, further including steps of:
loading a software application with a theme; and
selecting the animated feedback confirmation graphic to have visual elements corresponding with the theme.

14. The method recited in claim 9, further including a step of performing an irrevocable action after a predetermined period of time.

15. In a computing environment, the computing environment comprising a touch-sensitive display configured to be used as an input-receiving device, a method comprising steps of:
displaying a control for a software application on a touch-sensitive display;
detecting contact with the touch-sensitive display at an original location at coordinates corresponding with the control;
displaying an animated rendering, including the animated rendering moving, on the touch-sensitive display in response to the detected contact and continuing to display portions of the animated rendering on the display so long as contact remains with the display, including not continuous contact at the original location, but rather the user contact following the movement of the animated rendering; and
exiting the software application at the conclusion of the animated rendering as a result of detecting that the contact was maintained throughout a time period extending from initiation to conclusion of the animated rendering and wherein the period extending from the initiation to conclusion of the animated rendering is a period included in the range of one-half second to one minute so as to prevent the exiting the software application as a result of inadvertent contact with the display and if the contact is interrupted prior to an end of the animated rendering, then ceasing displaying the animated rendering and not performing the action and resetting the control.

16. The method recited in claim 15, wherein the step of displaying the animated rendering includes modifying a color of at least a portion of the animated rendering.

17. The method recited in claim 15, wherein the step of displaying the animated rendering includes modifying at least one of a width, a length, a color gradient, and a color spectrum of at least a portion of the animated rendering.

18. The method recited in claim 15, wherein the step of displaying the animated rendering includes providing an audible signal.

19. The method recited in claim 15, wherein the step of displaying the animated rendering includes moving a portion of an image associated with the control.

20. The method recited in claim 15, further including a step of selecting the animated rendering to have visual elements corresponding with a theme of the software application.

* * * * *